United States Patent [19]

Ito

[11] Patent Number: 4,779,947

[45] Date of Patent: Oct. 25, 1988

[54] OPTICAL-FIBER COUPLING DEVICE

[75] Inventor: Takao Ito, Yokohama, Japan

[73] Assignee: Kabushiki Kaisha Toshiba, Kawasaki, Japan

[21] Appl. No.: 685,799

[22] Filed: Dec. 24, 1984

[30] Foreign Application Priority Data

Dec. 26, 1983 [JP] Japan ................... 58-243725
Aug. 21, 1984 [JP] Japan ................... 59-172454

[51] Int. Cl.$^4$ ............................................. G02B 6/42
[52] U.S. Cl. ........................ 350/96.20; 350/96.15; 350/96.18
[58] Field of Search ............... 350/96.18, 96.20, 96.15; 250/227; 357/74

[56] References Cited

U.S. PATENT DOCUMENTS

| | | | |
|---|---|---|---|
| 3,966,299 | 6/1976 | Osterfield et al. | 350/96.21 |
| 4,015,894 | 4/1977 | Rocton | 350/96.21 |
| 4,281,891 | 8/1981 | Shinohara et al. | 350/96.18 |
| 4,296,998 | 10/1981 | Dufft | 350/96.20 |
| 4,433,898 | 2/1984 | Nasiri | 350/96.20 X |
| 4,440,470 | 4/1984 | Khoe | 350/96.18 X |
| 4,509,827 | 4/1985 | Cowen et al. | 350/96.20 x |
| 4,591,711 | 5/1986 | Taumberger | 250/227 |

FOREIGN PATENT DOCUMENTS

| | | |
|---|---|---|
| 53-55134 | 5/1978 | Japan . |
| 55-15184 | 2/1980 | Japan . |
| 56-147111 | 11/1981 | Japan . |
| 0192219 | 10/1984 | Japan ............... 350/96.15 |
| 2026194 | 1/1980 | United Kingdom ........... 350/96.20 |
| 2075709 | 11/1981 | United Kingdom . |

OTHER PUBLICATIONS

Patents Abstracts of Japan, vol. 5, No. 149 (E-75)[821], Sep. 19, 1981; & JP-A-56 83 084 (Matsushita Denko K.K.) 07-07-1981.
Patents Abstracts of Japan, vol. 5, No. 150 (P-81)[822], Sep. 22, 1981; & JP-A-56 83 710 (Nippon Denshin Denwa Kosha) 08-07-1981.

Primary Examiner—John Lee
Attorney, Agent, or Firm—Oblon, Fisher, Spivak, McClelland & Maier

[57] ABSTRACT

Disclosed is an optical fiber coupling device which comprises an optical fiber, a coupling member to which the optical fiber is coupled, a coupling means for coupling the optical fiber to the coupling member, and an optical-fiber fixing section for fixing a part of the optical fiber. The optical fiber is coupled only at its forward end to the coupling member. A part of the optical fiber is fixed at a position separated from the forward end of the optical fiber by a specified distance. Thus, the stress applied to the fixed section of the optical fiber is absorbed into a portion of the optical fiber located between the forward end of the optical fiber and the fixed section of the optical fiber fixed by the optical fiber fixing section and which covers the specified distance, thereby to prevent the stress from being applied to the forward end of the optical fiber.

22 Claims, 9 Drawing Sheets

OPTICAL-FIBER COUPLING DEVICE

BACKGROUND OF THE INVENTION

The present invention relates to an optical-fiber coupling device for coupling to an optical operation device an optical fiber for permitting input or output of optical information.

When it is desired to construct an optical transmission system, it becomes necessary to use various optical operation devices such as an optical coupler for causing an optical branching or merging, an optical switch for switching an optical transmission line, an optical multi-/demultiplexer for effecting optical wavelength division multiplexing transmission, etc., as well as an optical transmitter and optical receiver. For permitting input or output of optical information, thereby permitting the transmission of this information, an optical fiber is used in these devices. The connecting or coupling of the optical fiber to the optical operation devices is effected by the use of various methods. For example, Japanese Patent Disclosure (Kokai) No. 53-55134 discloses a fiber coupling device having a rod lens and an optical fiber. In this case, a resilient member is used for coupling the optical fiber to the rod lens. Japanese Patent Disclosure (Kokai) No. 55-15184 discloses an optical-fiber coupler unit wherein a light incident end face of the optical fiber and a glass plate are fixed to each other by means of an epoxy resin having a refractive index substantially equal to that of the optical fiber and glass plate. Further, Japanese Patent Disclosure (Kokai) No. 56-147111 discloses an optical-fiber connector unit with a fiber-side connector element to which an optical fiber is fixed, and an element-side connector element to which an optical receiving element is fixed, both said connector elements being detachable. In this case, as seen, a pair of connectors are used for coupling the rod lens and the optical fiber.

In the above-mentioned prior art optical-fiber coupling unit, respective axes of the optical fiber and the optical operation device are very likely to be misaligned due to mechanical or thermal displacements of the coupling members, used for coupling the optical fiber, and the members to be connected. This axial misalignment causes optical loss and, at the same time, deteriorates the fiber-insertion loss characteristic (optical loss due to insertion of the optical fiber) of the optical-operation device. Besides, this axial misalignment also raises the problem of decreasing the mechanical stability of the coupling unit.

SUMMARY OF THE INVENTION

The object of the present invention is to provide an optical-fiber coupling device which prevents misalignment of the axis between an optical fiber and a member to be connected with this optical-fiber.

To attain the above object, the optical-fiber coupling device according to the present invention comprises a block onto which light is incident or from which light emerges, an optical fiber, a coupling means for coupling the block and the optical fiber, and a fixing means for fixing the optical fiber. Only a forward end portion of the optical fiber is coupled by the coupling means to a portion of the block at which an optical coupling is to be achieved. This coupled section is defined as being a first fiber fixing section. A fiber fixing section which fixes a portion of the optical fiber, spaced by a specified distance from the forward end of this optical fiber, is defined as being a second fiber fixing section. The second fiber fixing section is fixed directly or indirectly to the block. Between the first and second fiber fixing sections, a fiber element portion of the optical fiber is allowed to exist so as to permit this optical fiber to maintain its flexibility. The temperature expansion coefficient of the optical fiber is selected, relative to the fixing means, such that the temperature expansion of the fixing means is substantially equal to that of the fiber, as a result of which thermal stresses can be accommodated by the flexibility of the fiber. The stress applied to the second fiber fixing section is absorbed into the fiber element portion between the first and second fiber fixing sections. As a result, the stress is prevented from further acting on the forward end of the optical fiber. Accordingly, it is possible to provide an optical-fiber coupling device capable of preventing positional displacements from occurring in the optical-fiber coupling portion due to the application of a mechanical force, and in which the optical loss in the coupling portion is very small. Moreover, this optical-fiber coupling device is also excellent in respect to its temperature characteristic.

BRIEF DESCRIPTION OF THE DRAWINGS

Other objects, features and advantages will be apparent from the following description when the same are taken in conjunction with the accompanying drawings in which.

DETAILED DESCRIPTION OF THE PREFERRED EMBODIMENTS

Figure 1:
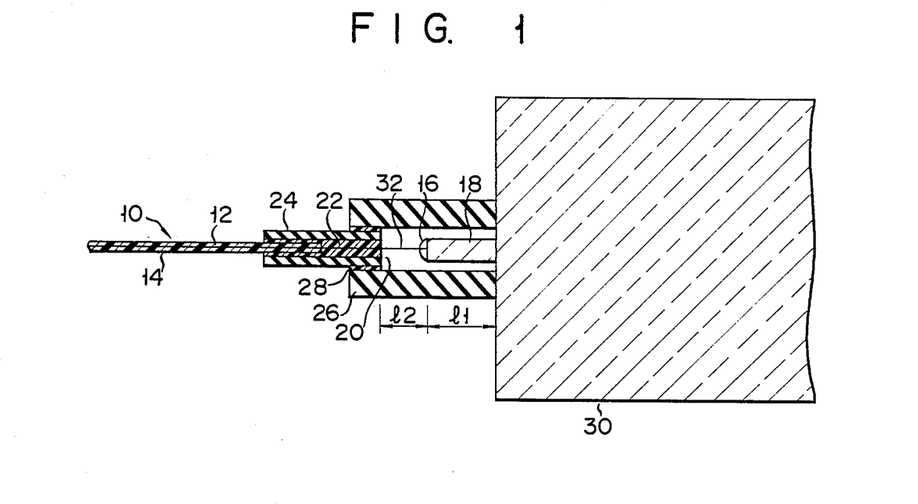
FIG. 1 is a sectional view of an optical-fiber coupling device according to a first embodiment of the present invention.

A first embodiment of the present invention will now be described with reference to FIG. 1. An optical fiber 10 is comprised of a fiber element 12 and a nylon jacket 14 for covering the fiber element 12. Only a forward end of the fiber element portion 12, prepared by removing the nylon jacket 14, is coupled to one end of a rod lens 18 by an adhesive agent consisting of, for example, UV curing resin or epoxy resin. Further, the optical fiber element 12 has its part fixed in an optical-fiber fixing section 20, spaced by a specified distance from its forward end, for the purpose of maintaining the flexibility of the optical fiber. In the optical-fiber fixing section 20, that part of the optical fiber element 12 and an immediately succeeding part of the optical fiber 10 covered by the jacket are inserted into a protective sleeve 24 and are adhered to this sleeve 24 by an adhesive agent 22. One end of this protective sleeve 24 is inserted into one end of a connecting sleeve 26, which consists of a multi-compound glass, and is bonded thereto by an adhesive agent 28. The connecting sleeve 26 is fixed at its other end to a block 30 consisting of an optical glass capable of transmitting at least a light having a specified wavelength in a state wherein the rod lens 18 is inserted thereinto. The other end of the rod lens 18 is fixed to the block 30. Accordingly, for example, the optical information transmitted by way of the optical fiber 10 is converted into collimated beams in the rod lens 18. The collimated beams are then transmitted through the block 30. The block 30 is formed of, for example, borosilicate glass. That part of the optical fiber element 12 which resides between the forward end thereof and the optical-fiber fixing section 20 constitutes an optical fiber element section 32 and is exposed to the air. This section 32 is not limited to being exposed to the air, but may be exposed to another gas or fluid. Further, it may be buried within a soft material such as, for example, urethane. The characterizing features of this first embodiment are first, that only the forward end of the optical fiber 10 is connected to the rod lens 18 by the adhesive agent 16, and second, that the stress applied to the optical-fiber fixing section 20 is absorbed into the optical-fiber element section 32 located between the forward end of the optical fiber 10 and the fixing section 20 thereof, whereby this stress can be prevented from being exerted upon the forward end of the optical fiber 10. That is to say, the optical fiber element section 32 can be flexed in such a manner as to absorb the stress applied thereto.

The optical fiber coupling device having the foregoing construction can be manufactured as follows. First, the adhesive agent 16 is fully coated or applied onto one end of the rod lens 18. Then, the optical fiber 10 fixed to the protective sleeve 24 is positioned with respect to the rod lens 18 by use of a center alignment jig. Next, the protective sleeve 24 in which the optical fiber 10 is inserted is adhered or fixed to the block 30 by way of the connecting sleeve 26. When the optical-fiber coupling device is formed in that way, it is possible to couple the optical fiber 10 and the rod lens 18 at one small area without disposing any adhesive agent in the space created between said one end of the protective sleeve 24 and said one end of the rod lens 18. In the surrounding area of the optical fiber element section 32, therefore, no possibility exists of producing stress due to either the solidification or variation in temperature of the adhesive agent; therefore, it is possible to prevent the forward end of the optical fiber 10 from having its axis displaced from that of the rod lens 18. Moreover, the fiber element of the optical fiber element section 32 is flexible. Therefore, the stress, which may result when the adhesive agent 22 in the protective sleeve 24 or the adhesive agent 28 between this protective sleeve 24 and the connecting sleeve 26 is solidified or has its temperature varied, is absorbed into this fiber element 12 because of its flexibility. Accordingly, it is possible to prevent the forward end of the optical fiber 10 from being displaced from the rod lens 18. If the length of the optical fiber element section 32 is chosen to be about 3 mm or more, then it will be sufficient for preventing such displacement. The optimum requirement, which should be satisfied by the length l1 of the rod lens 18 and the length l2 of the optical fiber element section 32, in order to prevent said displacement is shown below. When it is now assumed that $\alpha r$ represents the coefficient of linear expansion of the rod lens 18, $\alpha f$ represents the coefficient of linear expansion of the fiber element 12 of the optical-fiber element section 32, and $\alpha s$ represents the coefficient of linear expansion of the connecting sleeve 26, the lengths l1 and l2 have only to satisfy the following requirement. That is to say:

$$l1(\alpha r - \alpha s) \approx l2(\alpha s - \alpha f) \quad (1).$$

If this requirement is satisfied, the stress applied to the optical fiber can be substantially zero, independent of temperature variation. For example, if the rod lens 18 has a linear expansion coefficient of $\alpha r = 10 \times ^{-6}$ 1/°C., on the assumption that it is formed of glass, the fiber element 12 of the optical fiber 10 has a linear expansion coefficient of $\alpha f = 0.4 \times 10^{-6}$ 1/°C., on the assumption that it is formed of silica glass, the connecting sleeve 26 has a linear expansion coefficient of $\alpha s = 5 \times 10^{-6}$ 1/°C., on the assumption that it is formed of ceramic, and the rod lens 18 has a length of l1 = 6.5 mm, then the optical fiber element section 32 will have a length of l2 of 7.1 mm. Therefore, the optical-fiber element section 32 needs to only be set to that length. In the optical fiber coupling device in which the above requirement is satisfied in this way, even when a thermal external force is applied to the protective sleeve 24, such force will not be extended directly to the forward end of the optical-fiber element section 32 and the rod lens 18. Accordingly, such force will not have any undesirable effect upon the quality of the coupling between the optical fiber 10 and the rod lens 18. It should be noted here that in order to make the obtical-fiber element section 32 flexible, this section 32 may be slightly flexed or made spiral beforehand.

It may be appreciated that if equation 1 is satisfied the temperature or thermal expansion of the connecting sleeve 26 will equal the temperature or thermal expansion of the rod lens 18 and optical fiber element section 32.

If the optical-fiber coupling device is constricted in the above-mentioned way, even when heat cycles are applied to this coupling device, separation or disconnection becomes less likely to occur in the optical coupling due to the solidification of the adhesive agent. For instance, even when 100 heat cycles each defined between $-20°$ C. and $+60°$ C. were applied, no disconnection occurred in the optical coupling of the optical-fiber coupling device according to the present invention. In contrast, when heat cycles were also applied to the prior art optical-fiber coupling device having its optical-fiber element section 32 wholly covered by adhesive agent, disconnection occurred in its optical couplings.

Figure 2:
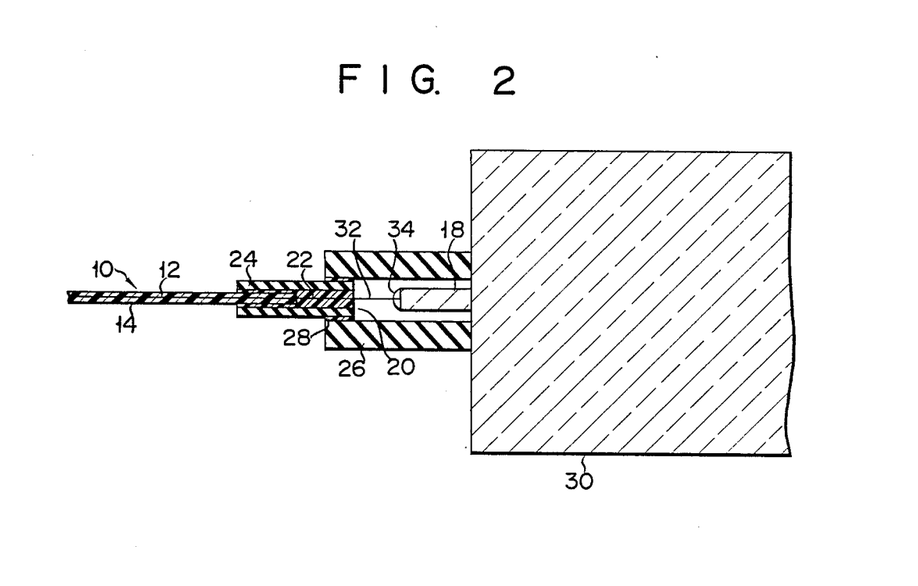
FIGS. 2 through 17 are sectional views of optical-fiber coupling devices according to the other embodiments of the present invention.

An optical-fiber coupling device according to a second embodiment of the present invention will now be described with reference to FIG. 2. In this embodiment, the forward end of the fiber element 12 of the optical fiber 10 is coupled to one end of the rod lens 18 by use of a soldering glass 34. Where, in this way, the optical fiber 10 is coupled to the rod lens 18 by use of soldering glass 34, the rod lens 18 is first erected vertically, and the soldering glass 34 is fully applied onto the end face of the rod lens 18 in such a manner that it rises therefrom. Then, the soldering glass 34 is heated by means of, for example, a $CO_2$ laser. Upon heating, the soldering glass 34 is liquefied. Under this condition, the fiber element 12 is aligned with the rod lens 18, and then the resultant joined portion is cooled. It should be noted here that if, in this case, the soldering glass 34, fiber element 12 and rod lens 18 have substantially the same coefficient of linear expansion, it will sufficiently serve the purpose. The other construction is the same as in the first embodiment and, therefore, the same parts or portions and sections are denoted by the same reference numerals, respectively, and a description thereof is omitted.

Figure 3:
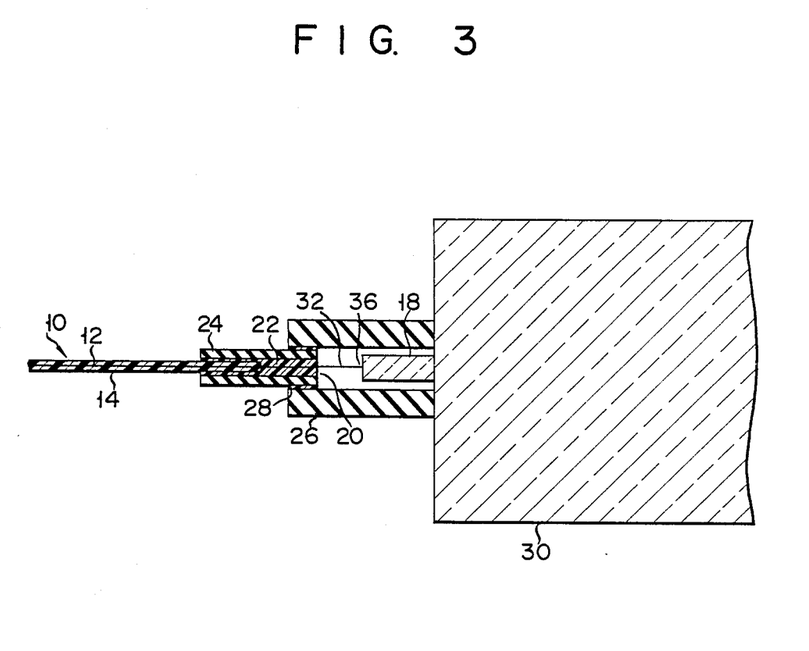

Next, an optical-fiber coupling device according to a third embodiment of the present invention will be described with reference to FIG. 3. In this embodiment, the forward end of the fiber element 12 of the optical fiber 10 is bonded to the rod lens 18 by thermal fusion. This thermally fused portion is denoted by a reference numeral 36. If the rod lens 18 and fiber element 12 have substantially the same coefficient of linear expansion, a good thermal fusion will become possible. Where thermal fusion is effected, for example, a CO$_2$ laser may be used as the heat source. Generally speaking, the connection which has been achieved by thermal fusion has a merit in that it has higher stability and reliability than the connection which has been achieved by use of an adhesive agent. The other construction is the same as in the first embodiment. Therefore, the same parts and sections are denoted by the same reference numerals, and their description is omitted.

Figure 4:
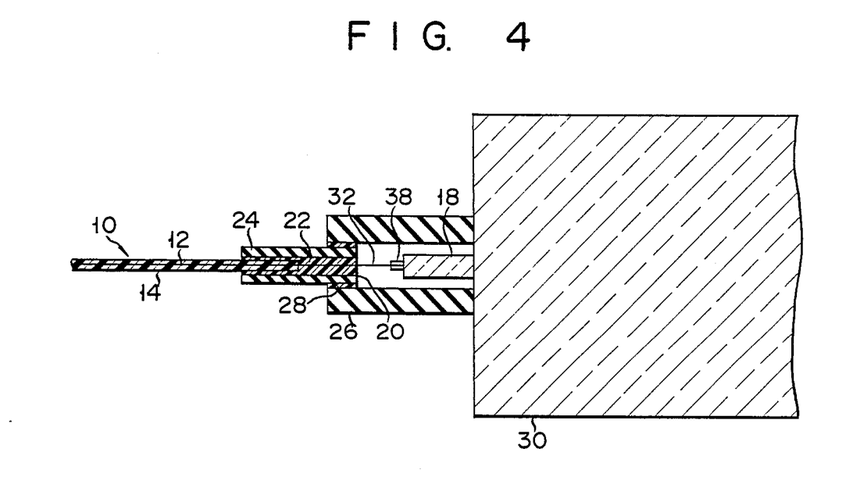

Next, an optical-fiber coupling device according to a fourth embodiment of the present invention will be described with reference to FIG. 4. In this embodiment, the forward end of this fiber element 12 is inserted into a minute sleeve 38 for fixing the fiber element 12. The minute sleeve 38 is formed of multi-compound glass or ceramic. The fixation of the minute sleeve 38 to the fiber element 12, as well as the fixation of the minute sleeve 38 to the rod lens 18, is achieved by use of an adhesive agent consisting of epoxy resin. For materializing this structure, after the fiber element 12 is inserted into the minute sleeve 38, the positioning of the fiber element 12 with respect to the rod lens 18 is performed by use of a center alignment jig. Thereafter, the fiber element 12 and the rod lens 18 are coupled together with the use of the adhesive agent and the minute sleeve 38. The inner diameter of the minute sleeve 38 may be of any dimension as long as it is slightly greater than the diameter of the fiber element 12 and yet permits this element 12 to be inclined within the sleeve 38. On the other hand, the outer diameter of the minute sleeve 38 may be of any dimension as long as it is not greater than the diameter of the rod lens 18. Further, the length of the minute sleeve 38 may be in the range of 0.5 mm to 1.0 mm or so.

When the minute sleeve 38 is used in the above-mentioned way, the resultant optical-fier coupling device advantageously increases in mechanical strength. Further, when the minute sleeve 38 is used, it will be sufficient if only the necessary portions are heated by use of, for example, a nichrome wire. Therefore, it is possible to shorten the time length required for the adhesive agent to harden. Further, the use of the minute sleeve 38 eliminates the necessity of keeping the entire assembling jig at high temperature, so that the working efficiency increases. The other construction is the same as in the preceding first embodiment. Therefore, the same parts and sections are denoted by the same reference numerals, and their description is omitted.

Figure 5:
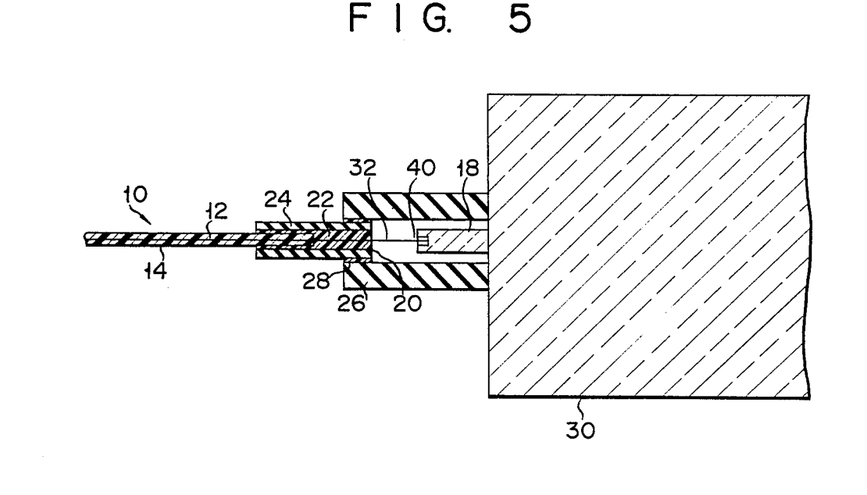

Next, an optical-fiber coupling device according to a fifth embodiment of the present invention will be described with reference to FIG. 5. In this embodiment, as shown in FIG. 5, a small hole 40 is formed at the one end portion of the rod lens 18, and the forward end of the fiber element 12 of the optical fiber 10 is secured to this small hole 40 by use of the adhesive agent. Such a small hole 40 can be formed in a large number by using, for example, an etching technique. Further, the use of said small hole 40 makes it possible to easily align the optical fiber 10. Another construction other than that which has been mentioned above is the same as in the first embodiment. Therefore, the same portions and sections are denoted by the same reference numerals, and their description is omitted.

Figure 6:
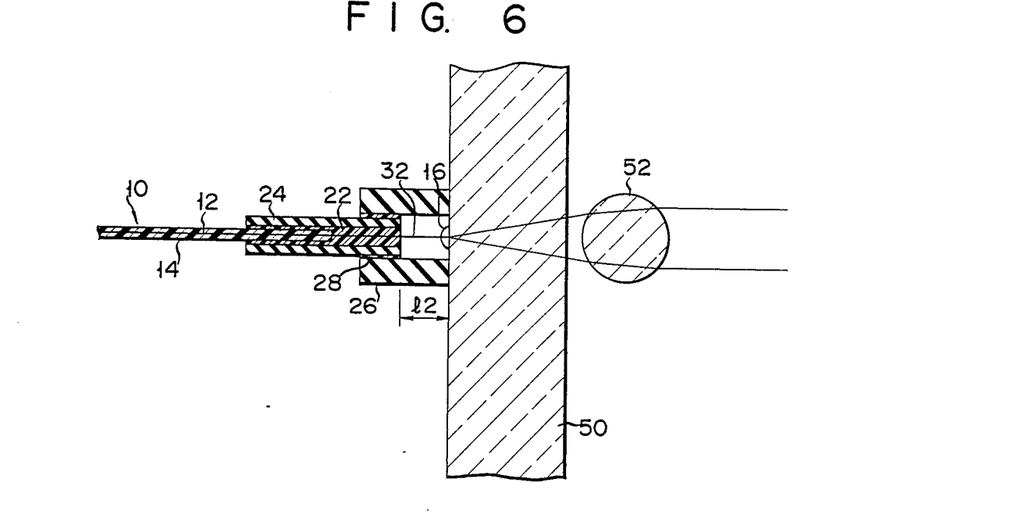

Next, an optical-fiber coupling device according to a sixth embodiment of the present invention will be described with reference to FIG. 6. In the first to fifth embodiments, the optical fiber 10 was coupled to the rod lens 18. In this embodiment, however, the optical fiber 10 is coupled to a plate-like block 50 by use of the adhesive agent 16. This plate-like block 50 is formed of optical glass consisting of silica glass. The block 50 may be formed of sapphire. The block 50 may be formed of any other material if it permits the transmission therethrough of at least a light having a specified wavelength. The block 50, as shown, is optically coupled to an optical lens 52. The other construction is the same as in the first embodiment. Therefore, the same portions and sections are denoted by the same reference numerals, and their description is omitted.

In the case of the sixth embodiment, the optimum requirement, which must be satisfied by the length 12 between the forward end of the fiber element 12 and the illustrated rightward end of the protective sleeve 24, is shown below. When it is now assumed that the rod lens is not provided, the length thereof is zero (i.e., 11=0) in the above-mentioned formula (1). Therefore, the formula (1) is rewritten such that:

$$\alpha as \approx \alpha f \qquad (2).$$

That is to say, the optimum requirement is merely that the respective coefficients of linear expansion of the connecting sleeve 26 and the fiber element 12 of the optical-fiber element section 32 be substantially equal to each other.

As in the earlier embodiment, the connection will not be stressed so long as the degree of temperature or thermal expansion of the connecting sleeve 26 is substantially equal to that of the optical fiber element section 32. This also applies to the later described embodiments.

Figure 7:
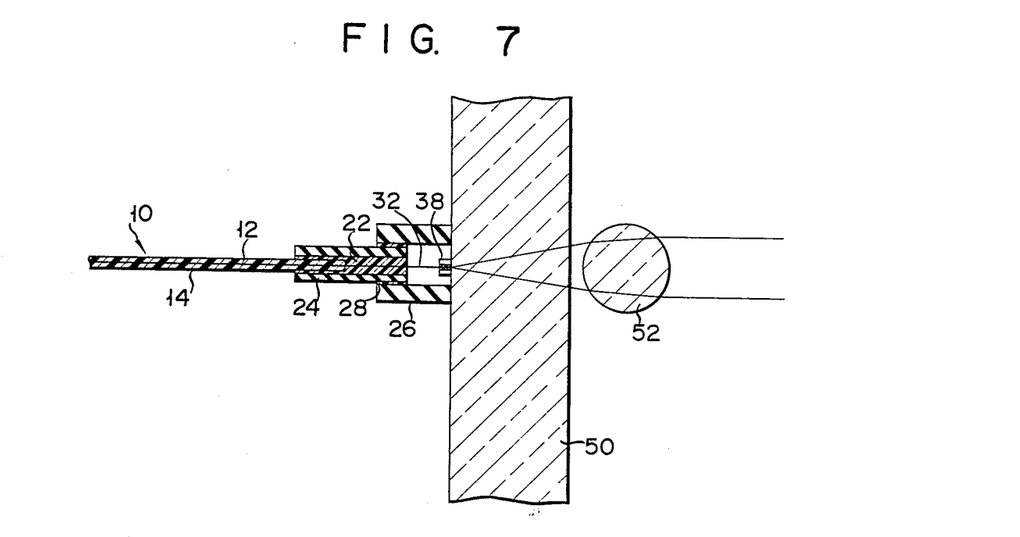
Figure 8:
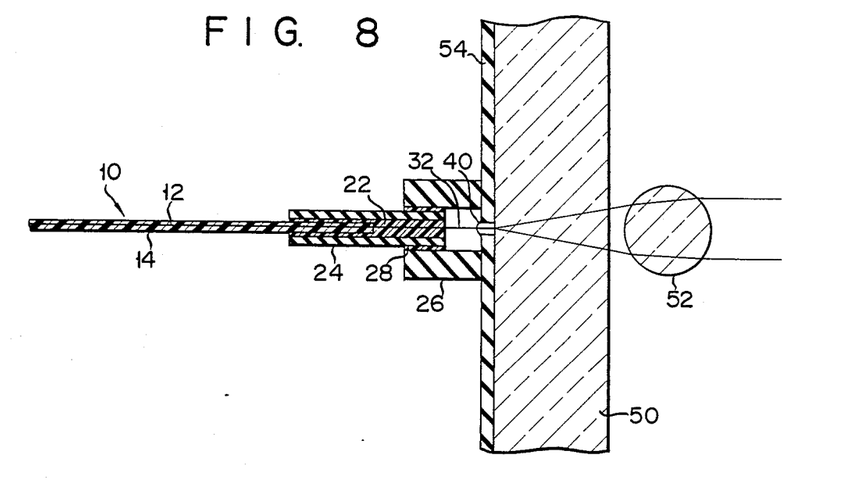
Figure 9:
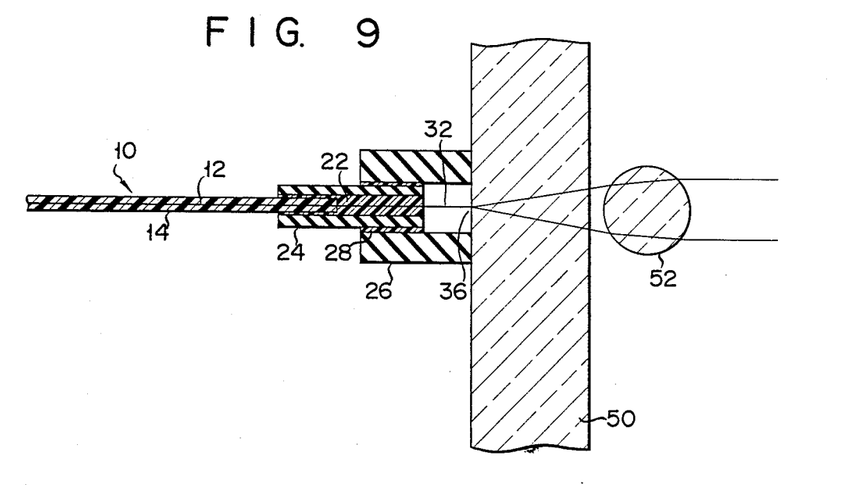

Note here that the means whereby the fiber element 12 is coupled to the block 50 is not limited to the adhesive agent 16. Both may be coupled together by using the coupling means shown in the second to fifth embodiments. That is, as shown in FIG. 7, both may be coupled together by use of the minute sleeve 38. Further, as shown in FIG. 8, a small hole 40 may be formed in a thin, dielectric film 54 of SiO$_2$ that has ben provided, for example, by deposition, on the surface of the block 50, thereby to mechanically and optically couple the fiber element 12 to the block 50. Further, as shown in FIG. 9, both may be coupled together by thermal fusion. It should be noted here that the optical lens 52 may be, for example, a rod lens.

Figure 10:
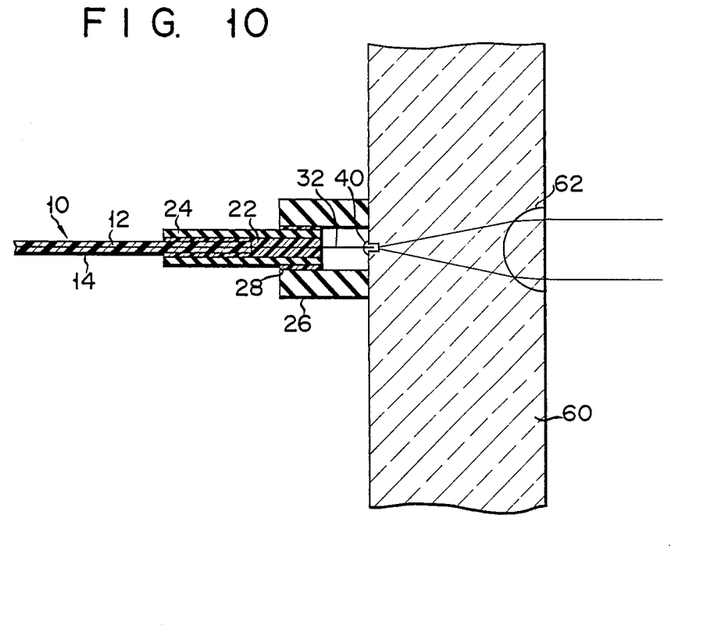

Next, an optical-fiber coupling device according to a seventh embodiment of the present invention will be described with reference to FIG. 10. In this embodiment, an optical lens mechanism 62 is formed in the plate-like block 60. The block 60 containing such an optical lens mechanism 62 can be manufactured by using an ion diffusion technique as in the case of manufacturing, for example, an ordinary rod lens. Further, the block 60 can also be manufactured by burying a sphere lens or rod lens into a plastic body. When the fiber element 12 is coupled to the plate-like block 60, it is possible to adopt the method of forming the small hole 40 shown in the fifth embodiment with respect to the end face of the block 60. When this method is adopted, it becomes easy to align the forward end of the fiber element 12 with respect to the small hole 40.

Figure 11:
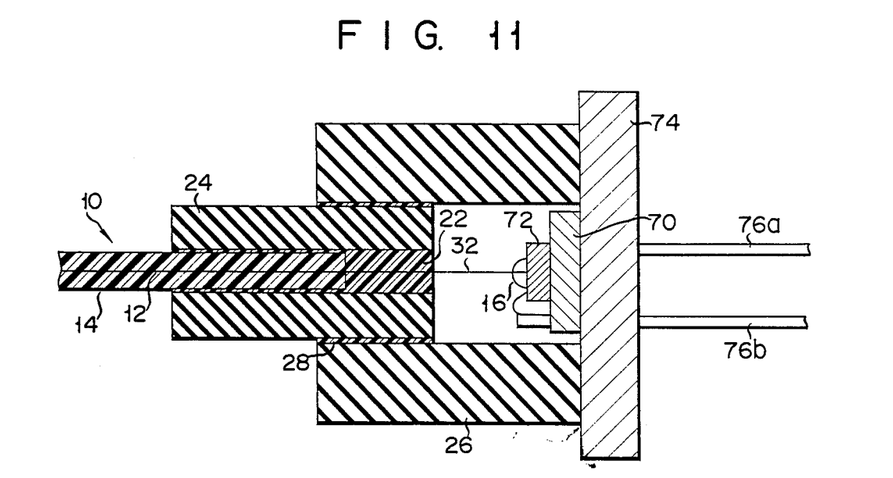

Next, an optical-fiber coupling device according to an eighth embodiment of the present invention will be described with reference to FIG. 11. In this embodiment, the fiber element 12 of the optical fiber 10 is coupled onto an optical semiconductor element 72 provided on a mounting base 70 consisting of gold-plated kovar. The forward end of the fiber element 12 is secured to the optical semiconductor element 72 by use of the adhesive agent 16. This forward end may also be secured thereto by use of the soldering glass. The mounting base 70 is secured to a block 74 consisting of gold-plated kovar. The optical semiconductor element 72 is connected to lead wires 76a and 76b each consisting of gold-plated kovar. The other construction is the same as in the first embodiment. Therefore, the same parts and sections are denoted by the same reference numerals, and their description is omitted.

Figure 12:
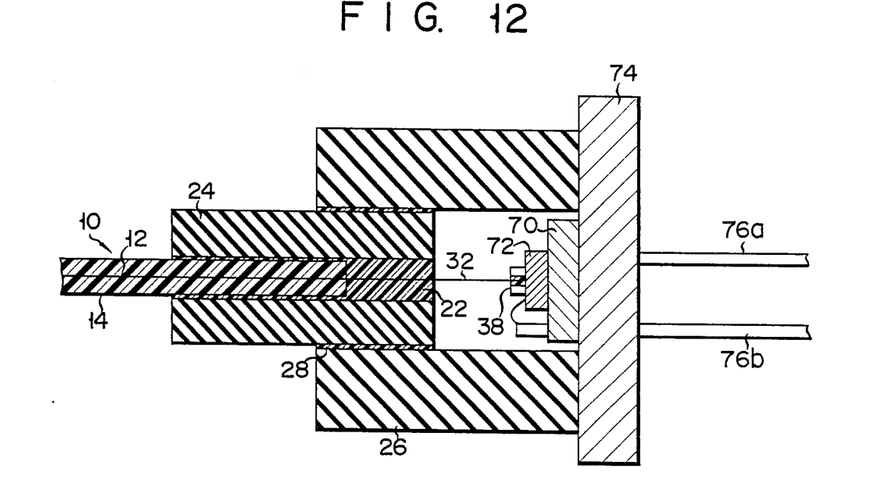

Note here that as shown in FIG. 12, the fiber element 12 of the optical fiber 10 may also be secured to the optical semiconductor element 72 via the minute sleeve 38 by the use of an adhesive agent, as shown in the fourth embodiment. The optical semiconductor element 72 may be one which functions as a light emitter or one which functions as a light receiver.

Figure 13:
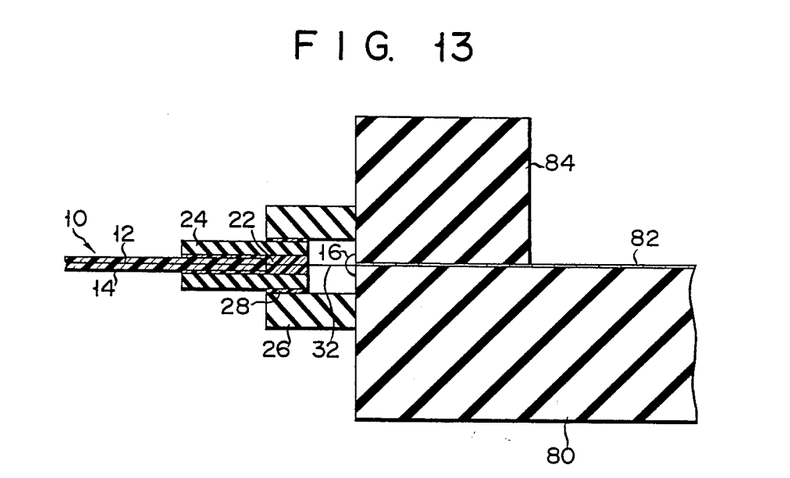
Figure 14:
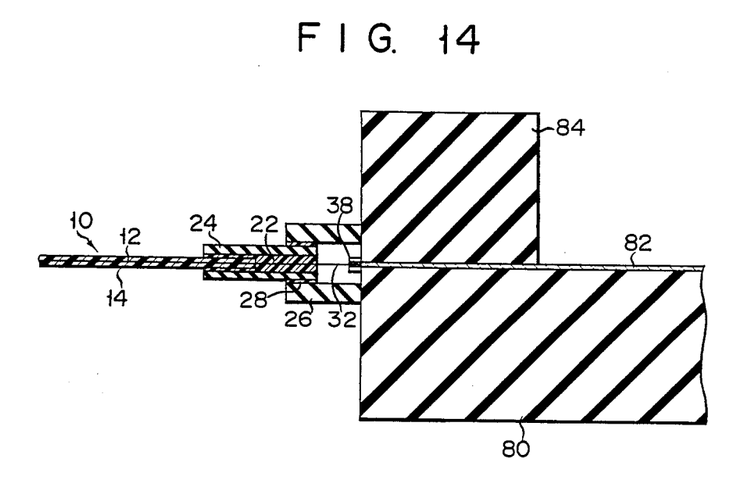
Figure 15:
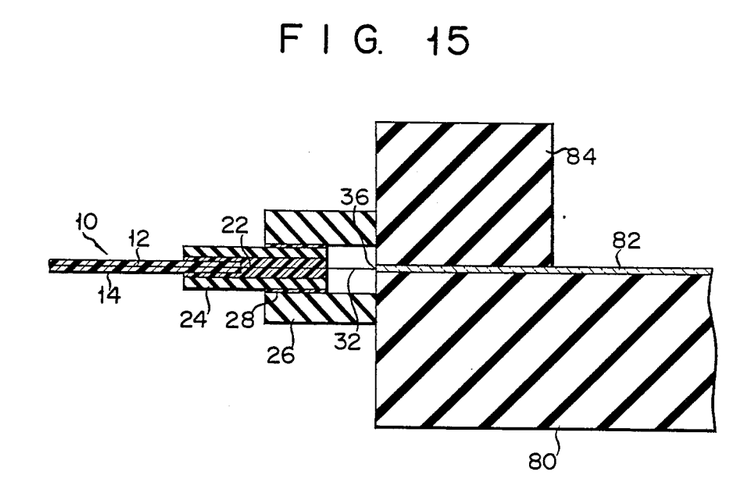

Next, an optical-fiber coupling device according to a ninth embodiment of the present invention will be described with reference to FIG. 13. In this embodiment, the fiber element 12 is coupled to an optical waveguide 82 formed on the surface of a block 80 consisting of LiNbO$_3$. The optical waveguide 82 is obtained by diffusing, for example, Ti on the surface of the block 80. The optical waveguide 82 is allowed to exist in such a manner that it is sandwiched between the block 80 and an auxiliary block 84 for fixing the same. The optical waveguide 82 is not limited to that shown in this embodiment as long as it permits the transmission therethrough of at least a light having a specified wavelength. The connecting sleeve 26 is secured to the blocks 80 and 84. The fiber element 12 and the optical waveguide 82 are coupled to each other by the adhesive agent 16, as shown. The means whereby both are coupled together is not limited to the adhesive agent but may be soldering glass. Further, as shown in FIG. 14, both may be coupled via the minute sleeve 38 by the use of the adhesive agent. Further, as shown in FIG. 15, both may be coupled together by thermal fusion. The other construction is the same as in the first embodiment. Therefore, the same parts and sections are denoted by the same reference numerals, and their description is omitted.

Figure 16:
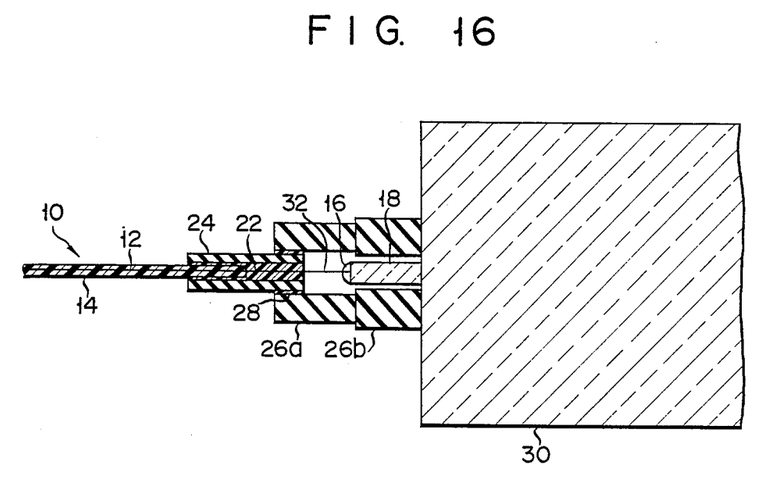

Next, an optical-fiber coupling device according to a tenth embodiment of the present invention will be described with reference to FIG. 16. In this embodiment, the connecting sleeve 26 of the optical-fiber coupling device shown in FIG. 1 is divided into two parts, i.e., a first portion 26a and a second portion 26b. Usually, when the aligning of the optical fiber 10 is performed, the connecting sleeve 26 is inserted beforehand over the protective sleeve 24, and this protective sleeve 24 is aligned after it is fixed to a center alignment jig. When, as in this embodiment, the connecting sleeve is divided into the first portion 26a and second portion 26b, since only the first portion 26a has to be inserted over the protective sleeve 24, it is possible to shorten the length of this protective sleeve 24. This offers the advantage of enabling the optical-fiber coupling device to be miniaturized. Further, if the second portion 26b of the connecting sleeve 26 has a precisely made inner diameter and the rod lens 18 is mounted in this second portion 26b, the handling of the rod lens 18 becomes easy.

Figure 17:
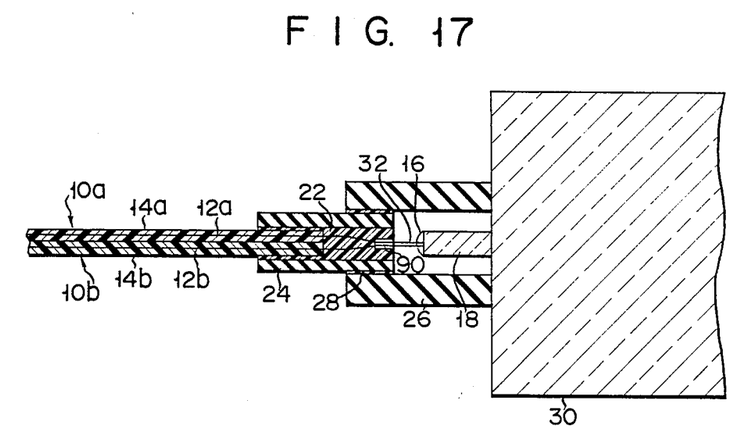

Next and finally, an optical-fiber coupling device according to an eleventh embodiment of the present invention will be described with reference to FIG. 17. In this embodiment, two optical fibers 10a and 10b are coupled to the single rod lens 18. The two optical fibers 10a and 10b are arranged in proper order within the protective sleeve 24 by the use of an arranging sleeve 90. The optical fibers employed are not limited to two in number, but three or more optical fibers may be employed. The other construction is the same as in the first embodiment and, therefore, the same parts and sections are denoted by the same reference numerals, respectively, and their description is omitted.

As described above, various modifications of the present invention can be obtained without departing from the spirit and scope of the invention.

What is claimed:

1. An optical-fiber coupling device comprising:
   a flexible optical fiber means, having one end and an other end, for transmitting a light received at the one end to the other end;
   an optical coupling member having one end and an other end to which said one end of said optical fiber means is mechanically coupled by means of an optical coupling means so that the light may be transmitted between the optical fiber means and the optical coupling member;
   an optical glass member for holding the other end of said optical coupling member for receiving at least the light transmitted through the optical coupling member;
   an optical-fiber fixing member for fixing a part of said flexible optical fiber means at a position separated from the one end of said flexible optical fiber means by a specified distance; and
   a supporting member, having one end fixed on said optical glass member, for supporting said optical-fiber fixing member so that an optical fiber portion of said optical fiber means located between the one end of said optical fiber means and a portion fixed by said optical-fiber fixing member and covering said specified distance is left flexible. claim 1, wherein said coupling means is a soldering glass.

2. The optical-fiber coupling device according to claim 1, wherein said coupling means is an adhesive agent.

3. The optical-fiber coupling device according to claim 1 wherein said coupling means is a soldering glass.

4. The optical-fiber coupling device according to claim 1, wherein said coupling means includes a minute sleeve into which the one end of said optical fiber means is inserted and an adhesive agent for fixing the one end of said optical fiber means to said minute sleeve and for coupling said minute sleeve to said coupling member.

5. The optical-fiber coupling device according to claim 1, wherein said coupling means is a thermal fusion layer formed in the boundary surface between said forward end of said optical fiber means and said coupling member.

6. The optical-fiber coupling device according to claim 1, wherein said coupling means includes a small hole formed in said coupling member and an adhesive agent for fixing said one end of said optical fiber means to said small hole.

7. The optical-fiber coupling device according to claim 1, wherein said coupling member is a rod lens to which said optical fiber means is coupled at said one end.

8. The optical-fiber coupling device according to claim 1, wherein said coupling member is a light transmission plate, which has an optical lens into which an optical information is introduced on the side opposite to that on which said optical fiber means is provided.

9. The optical-fiber coupling device according to claim 1, wherein said coupling member is a light transmission plate, which contains therein an optical lens mechanism into which an optical information is introduced.

10. The optical-fiber coupling device according to claim 1, wherein said coupling member is an optical semiconductor element, which has at least one of light-emitting and light receiving functions and to which said one end of said optical fiber means is coupled.

11. The optical-fiber coupling device according to claim 1, wherein said coupling member is an optical waveguide to which said one end of said optical fiber means is coupled and which is used to transmit an optical information.

12. The optical-fiber coupling device according to claim 1, wherein said optical-fiber fixing member includes a protective sleeve which covers said optical fiber means and thereby protects the same, an adhesive agent which adheres a portion of said optical fiber means covered by said protective sleeve to said protective sleeve, and a connecting sleeve which is connected to said protective sleeve and has a cross section greater than that of said protective sleeve, said connecting sleeve being fixed to said coupling member.

13. The optical-fiber coupling device according to claim 12, wherein said connecting sleeve includes a first portion fixed at its one end to said protective sleeve and a second portion which is fixed at its one end to the other end of said first portion and at its other end to said coupling member.

14. The optical-fiber coupling device according to claim 12, wherein said optical fiber means includes an optical fiber element and an optical-fiber covering means for covering said optical fiber element, that portion of said optical fiber means which extends from a specified position within said protective sleeve to said one end of said optical fiber means being removed from said optical-fiber covering means.

15. The optical-fiber coupling device according to claim 1, wherein said optical fiber means comprises a plurality of optical fiber elements.

16. The optical-fiber coupling device according to claim 1, which further comprises:
an atmosphere means which contacts a portion of said optical fiber means located between said one end of said optical fiber means and a fixed section of said optical fiber means fixed by said optical-fiber fixing member and covering said specified distance, whereby said atmosphere means and said portion of said optical fiber means absorb a stress applied to said fixed section of said optical fiber means, thereby to prevent said stress from acting on said one end of said optical fiber means.

17. The optical-fiber coupling device according to claim 16, wherein said atmosphere means is a gas.

18. The optical-fiber coupling device according to claim 17, wherein said gas is air.

19. The optical-fiber coupling device according to claim 16, wherein said atmosphere means is fluid.

20. The optical-fiber coupling device according to claim 1, wherein the supporting member has a temperature expansion coefficient having a value such that a temperature expansion of said supporting member is nearly equal to the sum of the expansions of the optical fiber means and the optical coupling member, whereby a stress applied to said part of said flexible optical fiber means is prevented from acting on said one end of said optical fiber means.

21. An optical-fiber coupling device comprising:
a flexible optical fiber means, having one end and an other end, for transmitting a light received at the one end to the other end;
a base plate having an upper surface;
an optical wavegude, formed on the upper surface of said base plate, for transmitting at least a light having a specified wavelength;
means for optically and mechanically coupling the one end of said optical fiber means to one end surface of said optical waveguide;
an optical-fiber fixing member for fixing a part of said flexible optical fiber means at a position separated from the one end of said flexible optical fiber means by a specified distance; and
a supporting member, having one end fixed on said base plate, for supporting said optical-fiber fixing member so that an optical fiber portion of said optical fiber means located between the one end of said optical fiber means and a portion fixed by said optical-fiber fixing member and covering said specified distance is left flexible.

22. The optical-fiber coupling device according to claim 21, wherein the supporting member has a temperature expansion coefficient having a value such that a temperature expansion of said supporting member is nearly equal to that of the optical fiber means, whereby a stress applied to said part of said flexible optical fiber means is prevented from acting on said one end of the optical fiber means.

* * * * *